March 31, 1925.                                              1,531,569
W. C. RADE
COMBINATION CAKE PAN
Filed Sept. 27, 1923

Inventor
William C. Rade
By Lancaster and Allwine
Attorneys

Patented Mar. 31, 1925.

1,531,569

UNITED STATES PATENT OFFICE.

WILLIAM C. RADE, OF PASADENA, CALIFORNIA.

COMBINATION CAKE PAN.

Application filed September 27, 1923. Serial No. 665,199.

*To all whom it may concern:*

Be it known that I, WILLIAM C. RADE, a citizen of the United States, residing at Pasadena, in the county of Los Angeles and State of California, have invented certain new and useful Improvements in Combination Cake Pans, of which the following is a specification.

The present invention relates to cooking utensils, and more particularly to a pan adapted for use in baking cakes and pies.

An object of this invention is to provide a combination cake pan wherein cakes of different sizes may be made and wherein a cake of hollow formation may be baked for subsequent filling, such as in the making of Boston cream pies.

Another object of the invention is to provide a set of devices which may be interchangeably and individually used in the production of cakes and the like of different sizes and formations and which may be quickly interlocked and released to admit of the quick and easy adjustment of the sections to enable their separate and combined use.

A still further object of the invention is to provide a combination cake pan of this character which comprises but relatively few parts capable of economical manufacture and which may be easily and quickly assembled and taken apart so that the parts may be thoroughly and easily cleansed.

The above and various other objects and advantages of this invention will in part be understood from and in part be described in the following detailed description of the present preferred embodiment, the same being illustrated in the accompanying drawing, wherein:

Fig. 4 is a reduced top plan view of the pan of Fig. 1, and

Fig. 5 is a similar view of the device adjusted into the position shown in Fig. 2.

Figure 1:
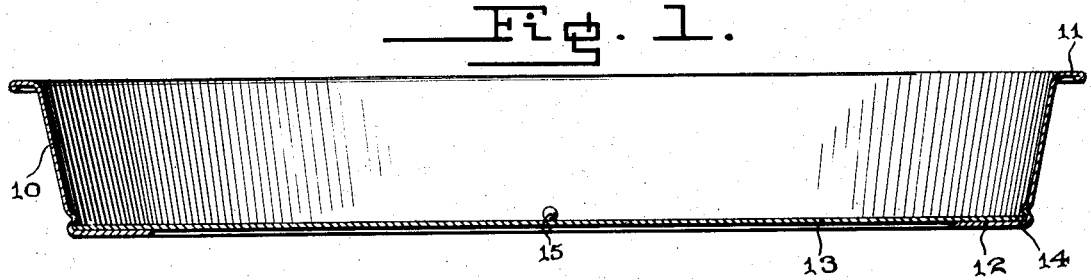
Fig. 1 is a transverse section through the device adjusted for use as an ordinary cake pan of large size.

Referring to the drawing, 10 designates the outer shell or ring of the main section which is in the general form of a large pan with an outturned flange 11 on its upper edge and inturned flange 12 at its lower edge. The flange 12 is of sufficient depth to ably support a bottom plate 13 which is removable through the top of the ring 10, the ring being given an upwardly flaring formation to provide the walls of the pan. The plate 13 is provided at suitable intervals thereabout with notches 14 adapted to receive studs 15 which are preferably pressed inwardly from the ring 10 near its lower edge in positions to hold the plate 13 flat upon the flange 12 and close the bottom of the ring 10. When in this position the parts 10 and 13 provide a large cake pan.

Figure 2:
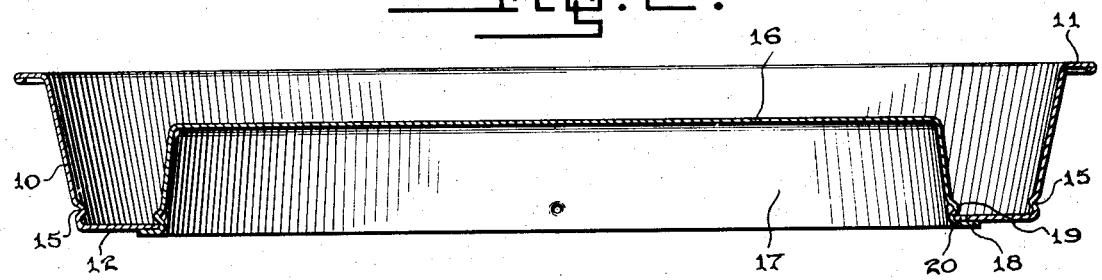
Fig. 2 is a similar view of the device adjusted for use in baking a hollow cake.
Figure 3:
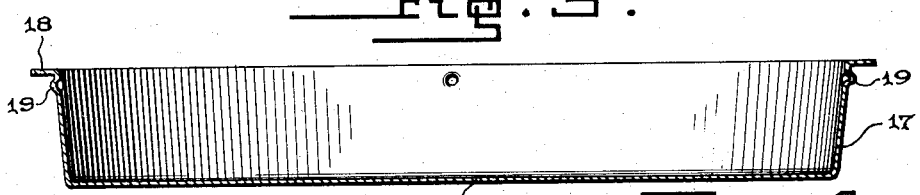
Fig. 3 is a like view showing a section of the device for use in making a small cake.
Figure 3:
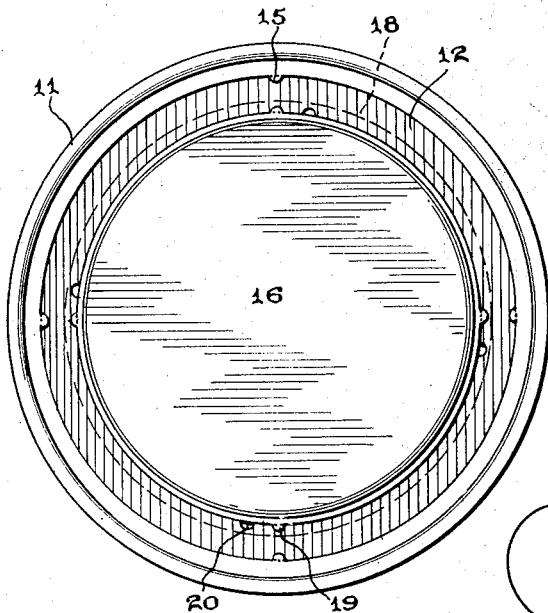
Figure 3:
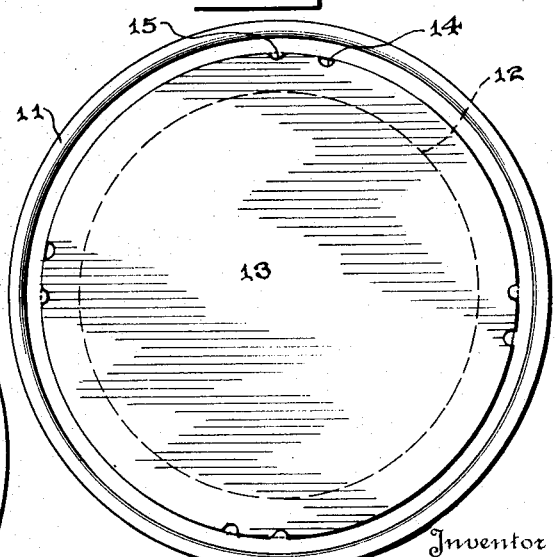

In Fig. 2 the ring 10 is provided with an inverted small pan section 16 which has a flaring wall 17 and a closed bottom and with an outturned flange 18 at its flaring or upper end. The upper flaring end of the small pan 16 is of sufficient size to snugly fit through the flange 12 of the ring 10 and the flange 18 is adapted to seat against the lower side of the flange 12 and to limit the upward insertion of the smaller pan 16. The wall 17 of the smaller pan is provided with a number of outwardly extending or pressed studs 19 adapted to engage over the upper side of the flange 12 so as to hold the smaller pan 16 from moving out of the opening in the larger pan. The flange 12 is provided at suitable intervals with openings 20 adapted to receive the studs 19 therethrough during the introduction and removal of the smaller pan 16.

In use, when the larger pan is to be employed the bottom plate 13 is inserted through the top of the pan and the openings 14 are brought into register with the studs 15 and the plate is then slid or turned upon the flange 12 so as to dispose the uninterrupted edge portion of the plate beneath the studs 15 to lock the plate in the ring.

The section 16 may be used by itself as the smaller pan, or it may be inverted and passed upwardly through the opening in the bottom of the larger pan after the plate 13 has been removed. The studs 19 of the smaller pan pass upwardly through the openings 20 and the pan 17 is turned so as to bring the studs 19 over the interrupted portion of the flange 12 to hold the smaller pan in inverted position through the bottom of the larger pan. In this latter position the device may be used for making Boston cream pies because the inverted smaller pan provides a hollow interior which may be subsequently filled with cream. This interior may of course be filled with fruit or the like.

The above specifically described form of the invention may be modified and changed as to size, proportion, and design without departing from the spirit of the invention and being restricted only by the scope of the following claims.

What is claimed is:

1. A cake pan comprising an outer ring section having an inwardly extending flange at its lower edge, a removable plate adapted to fit in the ring section and rest on said flange, a smaller pan section arranged to fit in inverted position through the flange of said ring and having an outturned flange on its upper edge adapted to engage the flange of the ring to determine the assembled positions of the ring and the pan, and co-acting means provided at the base of the outer ring section for interchangeably locking the bottom and smaller pan within the ring section.

2. A combination cake pan comprising a large pan having a removable bottom and a flange for supporting the bottom, and a smaller pan having an outturned flange at its upper edge, said smaller pan being interchangeable with said bottom and adapted to be fitted upwardly in inverted engaging position with the flange of the larger pan, the flange of the smaller pan being adapted to abut the under surface of the flange of the larger pan for limiting the upward movement of the smaller pan into the larger pan.

3. A combination pan comprising a ring having an inwardly extending flange at its lower edge and provided with inwardly extending studs in its side wall spaced slightly above said flange, a bottom plate adapted to seat on said flange and having notches in its edge through which said studs may pass, said plate when seated on the flange being adapted to be turned thereon for moving the notches out of register with the studs to lock the plate on the flange, and a small pan section having an outturned flange at its top and having a plurality of outward extending studs in its side wall near the top, the flange on said ring having notches adapted to receive therethrough the studs on the smaller pan when the latter is introduced upwardly in inverted position through the flange of the ring, said small pan being adapted to be turned in the flange of the ring for moving the studs out of register with the notches to thereby lock the small pan in the ring.

WILLIAM C. RADE.